(12) United States Patent
Hunter

(10) Patent No.: US 10,061,750 B2
(45) Date of Patent: Aug. 28, 2018

(54) ARRANGING ELEMENTS IN A LAYOUT

(71) Applicant: HEWLETT-PACKARD DEVELOPMENT COMPANY L.P., Houston, TX (US)

(72) Inventor: Andrew Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 14/768,834

(22) PCT Filed: Feb. 28, 2013

(86) PCT No.: PCT/US2013/028202
§ 371 (c)(1),
(2) Date: Aug. 19, 2015

(87) PCT Pub. No.: WO2014/133515
PCT Pub. Date: Sep. 4, 2014

(65) Prior Publication Data
US 2016/0004669 A1    Jan. 7, 2016

(51) Int. Cl.
| | | |
|---|---|---|
| *G06F 17/00* | (2006.01) | |
| *G06F 17/21* | (2006.01) | |
| *G06F 17/30* | (2006.01) | |
| *G06T 3/40* | (2006.01) | |
| *G06T 11/60* | (2006.01) | |

(52) U.S. Cl.
CPC ...... *G06F 17/212* (2013.01); *G06F 17/30259* (2013.01); *G06T 3/40* (2013.01); *G06T 11/60* (2013.01)

(58) Field of Classification Search
None
See application file for complete search history.

(56) References Cited

U.S. PATENT DOCUMENTS

| 6,826,727 B1 | 11/2004 | Mohr et al. |
| 7,617,449 B2 * | 11/2009 | Carlson ............... G06F 17/248 715/234 |
| 7,656,543 B2 * | 2/2010 | Atkins ............... H04N 1/00132 358/1.13 |
| 7,692,658 B2 | 4/2010 | Moore |

(Continued)

FOREIGN PATENT DOCUMENTS

| EP | 2068251 A2 | 6/2009 |
| WO | WO-2011/053602 A1 | 5/2011 |

OTHER PUBLICATIONS

"Standards-Based Adaptive Layouts in Windows 8 (and Ie10)," Mar. 24, 2012, pp. 1-76, Available at: <lazure2.wordpress.com/2012/03/24/standards-based-adaptive-layouts-in-windows-8-and-ie10/>.

(Continued)

*Primary Examiner* — Howard Cortes
(74) *Attorney, Agent, or Firm* — Fabian VanCott

(57) ABSTRACT

Arranging elements in a layout includes obtaining multiple elements to be arranged in a layout where the layout has at least one container to display multiple elements, determining a range of shapes for at least one of the multiple elements, determining merit values corresponding to the range of shapes, storing a description of the range of the shapes and at least some of the merit value, and arranging the multiple elements based on the merit value to be displayed in a display.

19 Claims, 10 Drawing Sheets

(56) References Cited

U.S. PATENT DOCUMENTS

| | | | |
|---|---|---|---|
| 9,244,917 B1* | 1/2016 | Sharma | G06F 17/30905 |
| 2005/0055635 A1* | 3/2005 | Bargeron | G06F 17/248 |
| | | | 715/251 |
| 2006/0031762 A1 | 2/2006 | Takashima | |
| 2006/0259857 A1* | 11/2006 | Atkins | G06T 11/60 |
| | | | 715/235 |
| 2007/0050729 A1* | 3/2007 | Kawamura | H04N 7/147 |
| | | | 715/781 |
| 2008/0181512 A1* | 7/2008 | Gavin | G06T 11/60 |
| | | | 382/209 |
| 2008/0295005 A1 | 11/2008 | Salesin et al. | |
| 2010/0269037 A1* | 10/2010 | Atkins | G09G 5/14 |
| | | | 715/244 |
| 2010/0329588 A1* | 12/2010 | Cheatle | G06K 9/00234 |
| | | | 382/298 |
| 2011/0025709 A1* | 2/2011 | Ptucha | G06T 11/60 |
| | | | 345/629 |
| 2011/0029860 A1* | 2/2011 | Ptucha | G06F 17/248 |
| | | | 715/246 |
| 2011/0157226 A1* | 6/2011 | Ptucha | G06T 11/60 |
| | | | 345/638 |
| 2012/0159314 A1 | 6/2012 | Schrier et al. | |
| 2012/0278704 A1* | 11/2012 | Ying | G06F 17/2247 |
| | | | 715/243 |
| 2012/0294514 A1* | 11/2012 | Saunders | H04N 1/00196 |
| | | | 382/159 |
| 2013/0114105 A1* | 5/2013 | Liu | G06F 17/3089 |
| | | | 358/1.15 |
| 2016/0371867 A1* | 12/2016 | Diverdi | G06T 11/206 |

OTHER PUBLICATIONS

International Searching Authority, International Search Report & Written Opinion, Dec. 2, 2013, 11 pages.

Ulrich Flemming, "Non-Monotonic Enumeration of Layout Alternative [i.e., alternatives] Using the LOOS Operators," Carnegie Mellon University, Engineering Design Research Center, Oct. 1992, pp. 1-18, Available at: <repository.cmu.edu/cgi/viewcontent.cgi?article=1185&context=ece>.

* cited by examiner

ARRANGING ELEMENTS IN A LAYOUT

BACKGROUND

A layout is part of a graphic design that organizes its elements in an arrangement to be displayed in the layout. Layouts are used in magazines and web pages to both convey information in an easy to understand manner as well as attract the attention of viewers. For example, an advertisement in a magazine may have a layout that includes an area for a title of a product, an image of the product, and text describing the product. The title, image, and text can be arranged in different ways. The layout determines the positions on the page where the title, image, and text will be. The layout also determines the shapes and sizes of the spaces occupied by the title, image, and text within the arrangement, and take into account the fit of the title, image, and text to those spaces.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Figure 1:
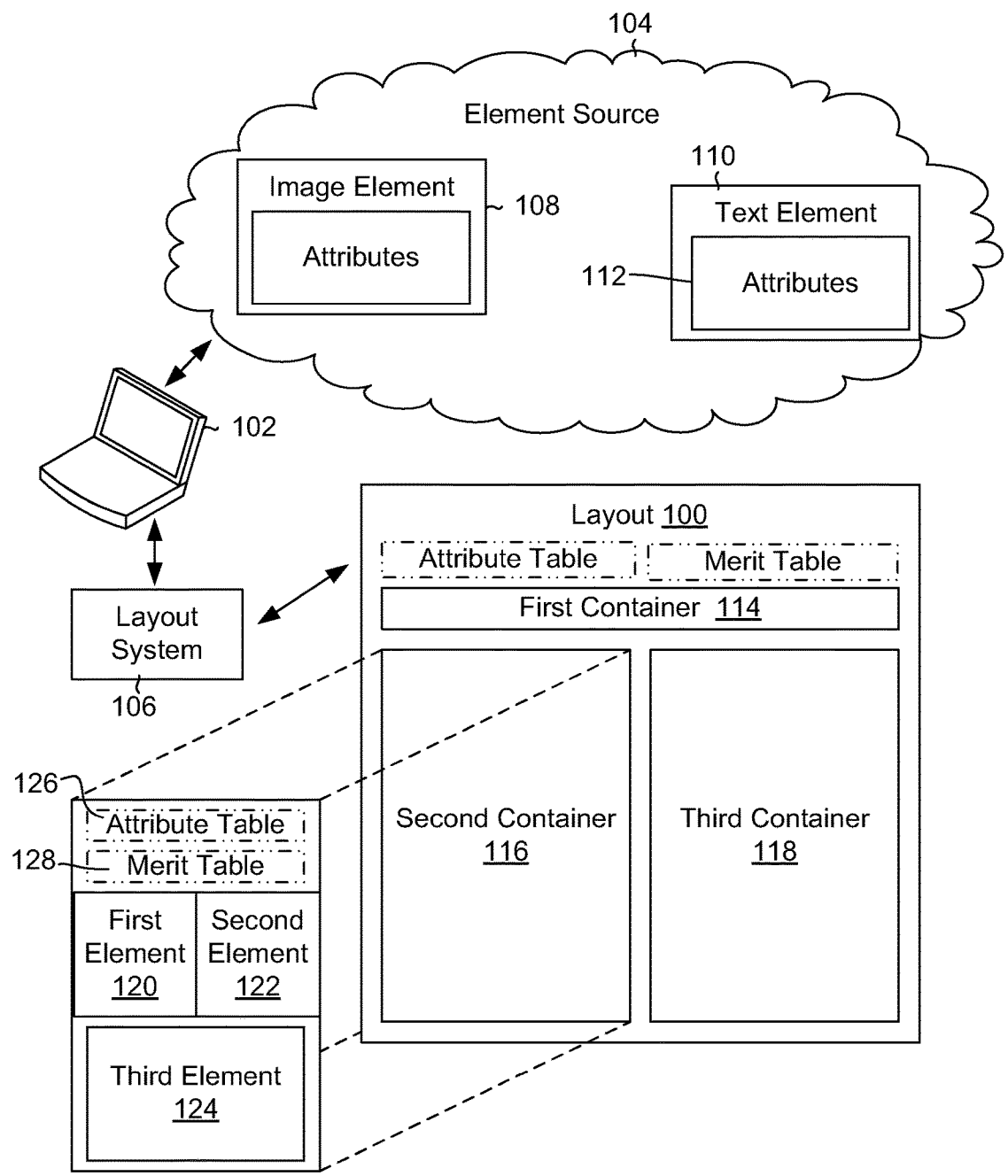
FIG. 1 is a diagram of an example of a layout according to the principles described herein.

Multiple layout options may be available for each set of elements intended to be grouped together in a layout. For example, the title can be placed at the top of the layout, the middle of the layout, the bottom of the layout, or either side of the layout. The image and text will generally not occupy the same space as the title, thus, they are positioned elsewhere on the page. Multiple permutations of different arrangements of just these three elements (title, image, and text) exist when the elements have fixed shapes and sizes. However, if the layout options include reshaping and resizing each of the elements, a greater number of permutations exist. Each permutation will also have a different aesthetic value than the others. As a result, an editor or another individual responsible for the end product wants to arrange the elements of the layout in the most effective manner by positioning the elements in effective areas of the layout with appropriate shapes and sizes.

Additional elements increase the number of layout permutations. For example, a layout with N elements may have N times as many permutations as a layout with merely N−1 elements.

A layout system is a combination of program instructions and hardware that arranges layouts automatically by positioning, shaping and sizing the elements to achieve what it considers to be the best aesthetic look given the number of elements and their associated characteristics. The layout system can resize or crop elements to fill white space or make room for other elements. However, merely resizing or cropping elements without regard for the visual contents in the elements may render the contents unsatisfactory in the final product. The layout system can also reshape and resize regions to be filled by sub-layouts. Again, reshaping and resizing without regard for the contents that will occupy the space may render the contents unsatisfactory. Thus, the layout system should be aware of the ranges and relative merit values of shape options for individual elements and sub-layouts when exploring how to arrange them.

For example, an element may be an image that contains two faces. A range that has some merit value for cropping includes a region from the image's edge to the edge of either of the faces. The merit value for forming a crop line through this region changes. Cropping the image so that the image's edge cuts through the hair associated with one of the faces has less merit value than cropping the image so that a portion of the hair was not cropped off. While less desirable than cropping outside of the face's hair, cropping through the hair would still have some merit value, albeit less merit value. However, forming the crop line so that there is a significant amount of space between the image's edge and the face may result in so much of the image's background that the merit value is also low.

On the other hand, cropping the image through one of the faces drops the merit value to zero. It may be more acceptable to crop one of the faces entirely out of the image than cutting through a face. In such a case, the region between the faces is another region that has some merit value for cropping. As a result, ranges with merit value include both the regions from the image's edges to the face edges and also the region between the faces. Here, these regions are not contiguous, but each represents ranges where cropping has some merit value.

The principles described herein include a method for automatically arranging elements in a finished layout of a product. Such a method includes obtaining multiple elements to be arranged in a layout where the layout has at least one container to display multiple elements, determining a range of shapes for at least one of the multiple elements, determining merit values corresponding to the range of shapes, storing a description of the range of the shapes and at least some of the merit data, and arranging the multiple elements based on the merit data to be displayed in a display. The store of merit data is described as a table throughout the following examples; however, any appropriate mechanism for storing the merit data may be used in accordance to the principles described herein, including mechanisms for regenerating the merit data.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

FIG. 1 is a diagram of an example of a layout (100) according to the principles described herein. In this example, a user interface (102) is in communication with both an element source (104) and a layout system (106), which generates and populates a layout (100). The user interface may be a desktop, a laptop, an electronic tablet, a phone, another device, or combinations thereof. The element source (104) may include any appropriate type of element. For example, the element source (104) may include an image element (108), a text element (110), another type of element, or combinations thereof.

Each of the elements (108, 110) may include a number of attributes (112). These attributes (112) are stored in metadata of the elements (108, 110).

A user may use the user interface (102) to select elements to populate the layout (100). In other examples, a program automatically selects the elements for the layout (100). In the example of FIG. 1, the layout (100) has a first container (114), a second container (116), and a third container (118). Each container (114, 116, 118) is capable of containing a single element, multiple elements, an additional container, or combinations thereof. The overall layout (100) may have its own arrangement where the containers (114, 116, 118) are positioned and sized according to a layout policy. Each container (114, 116, 118) also includes its own sub-layout that is an arrangement of the elements and sub-layouts contained directly within it. At both the overall layout layer and the sub-layout layers, the elements and/or containers are arranged as determined by a layout system (106). The layout system (106) can apply different methods and policies and can create different styles of layout at the overall layout and at each of the sub-layouts. In examples where the containers (114, 116, 118) contain additional containers, more layout layers that are processed with the layout system (106) are introduced.

In the examples of FIG. 1, the second container (116) contains a first element (120), a second element (122), and a third element (124). Each of these elements may be image elements, text elements, symbol elements, other types of elements, or combinations thereof. Each of the containers (114, 116, 118) contains a nested attributes table (126) that contains layout attributes belonging to each of the elements that it contains. For example, the attributes table (126) of the second container (116) includes information about the elements (120, 122, 124) within the second container. The attributes table includes information about the sizes, shapes, and other attributes that the elements can have when being displayed in the container. Each of the containers (114, 116, 118) also contains a nested merit table (128) that contains information about the ranges and associated merit values of shape descriptors belonging to each of the elements that it contains. A shape descriptor may be an attribute or a combination of multiple attributes that substantially determines the shape of an element within the container. The nested attributes tables (126) and merit tables (128) are not visible in the display with the other elements.

The choice of a suitable shape descriptor may depend on the application of the layout system (106) or on the style of the layouts. The shape descriptor may be chosen such that the merit values of the contents of the shape are substantially independent of the shape's arrangement in a layout. For example, if multiple image elements are to be arranged at a predetermined resolution within a layout, the aspect ratio of each image may be chosen as a suitable shape descriptor. In another example, if image and text elements are to be arranged such that each spans one or multiple predefined columns of a columnar style layout, the height of each element may be chosen as a suitable shape descriptor. In some cases, it may be appropriate to have more than one merit table for an element. For example, if the element can span one or multiple columns of a columnar style layout, it may be appropriate to choose height as a shape descriptor with a separate merit table for each span.

In one example, the attributes table (126) and the merit table (128) are populated with the values of attributes (112) stored in the metadata of the elements (120, 122, 124). In another example, the elements (120, 122, 124) are analyzed with an analyzer to populate the attributes table (126) and merit table (128) before being processed with the layout system (106). For example, the analyzer may use a face detector engine to detect faces in an image element in order to add the face positions as attributes of the image. Such an analyzer bases such decisions on a policy that has a set of rules for determining layout attributes, shape descriptor ranges and merit values according to the elements, their types and their metadata. For example, one rule might derive the value of a layout attribute that defines the maximum scale of an image in a layout from the resolution of the image element. Another rule might determine a range of valid image aspect ratios that can be achieved without cropping through the face or other area of interest in an image. Yet another rule might determine merit values for certain aspect ratios that define which aspect ratios correspond to the best image crops.

In examples where a merit table (128) relates to a container rather than a single element, the merit table can be derived at least in part from permutations of the merit tables (128) of its contents. The derivation of merit tables for containers is a first role of the layout system (106).

In this manner, when the contents of the second container (116) are being laid out, the second container (116) does not determine the layout attributes, shape descriptor ranges, and merit values for each of its elements because the second container (116) is already storing them. As a result, when the contents of the second container (116) are being laid out, just those layout permutations that are consistent with the shape descriptor ranges and layout attributes are considered. Also, when there are too many permutations for them all to be considered, those permutations with the most merit value are considered.

To layout the overall layout or a sub-layout in one of the containers (114, 116, 118), the layout system (106) explores a number of layout permutations that includes options for where to place elements and containers in the available space, how to resize them, how to reshape them, how to perform other changes to them, or combinations thereof. In its first role, the layout system (106) explores layout permutations in order to populate the merit table (128) of the container. That merit table will enable the permutations of multiple contents of the container to be treated substantially the same as a single element when it is being laid out as one of the nested contents of another higher level container. In its second role, the layout system (106) explores and ranks layout permutations in order to select particular shapes and arrangements of the elements and nested sub-layouts for the final display.

In a case where a shape descriptor does not fully specify the size and shape of an element in a layout, additional permutations may be considered by the layout system (106). For example, if a shape descriptor defines the height occupied by an element spanning a particular number of columns of a layout, additional layout permutations may include consideration of the same element spanning a different number of columns.

The layout's permutations may be created by looking at the information stored in the attributes tables (126) and the merit tables (128) of the containers (114, 116, 118). Although tables are described as being stored in the containers (114, 116, 118), any appropriate layout attributes and merit data can be stored or regenerated from alternative sources. In one example, the layout system (106) makes preliminary decisions for where to place and how to size, shape, or crop an element. The preliminary size of the element may be less than the maximum area, height, or width that will fill the space that the element is initially assigned to fill. The element is placed in the assigned space along with the other elements to their assigned places. At least one of the elements will be incrementally increased in size in at least one dimension, such as its height or width, until the layout appears to adequately fill their assigned spaces. Based on the merit value of the elements' potential attributes, the layout system (106) can cause some of the elements to extend into unfilled spaces or into the spaces initially assigned to the other elements so that overall, all of the elements have attributes with high merit value. For example, a specific element may stay under a particular size, width, or height before exhibiting a characteristic that causes the element to have attributes of low merit value. As such, that specific element will retain an attribute associated with high merit value while the surrounding elements are enlarged beyond their initially assigned boundaries. In such a manner, each of the elements fills the space of the layout while maintaining attributes with high merit value.

Each of the permutations is scored according to the merit tables (128) or according to an aesthetic scoring policy. The aesthetic scoring policy has a set of rules that determine whether a layout or sub-layout is aesthetic. For example, the policy may include a rule that accounts for how much white space is left in the layout or the sub-layout. Another rule may factor in the size of font in a text element. Yet another rule may deal with the amount of background that is left in an image element. The aesthetic scoring policy includes any appropriate type and/or number of rules to determine an aesthetic score. The layout system (106), in its first role, can use the aesthetic scores for permutations of a sub-layout to populate or modify the merit table for the sub-layout. In one example, if all of the permutations of a sub-layout can be scored, the scores may be used to derive range and merit values for the corresponding shape descriptors. In another example, if the merit tables (128) of two permutations of a sub-layout can be derived from the merit tables (128) of the elements of the sub-layout, the scores of the permutations may be used to weight the contributions of each of the merit tables (128) to the sub-layout merit table. When the layout system (106) in its second role is selecting particular shapes and arrangements of a layout or sub-layout, each of the permutations may be ranked based on its score, and one of the permutations may be selected to be the final layout based on a layout policy. For example, the layout policy may include a rule that indicates that the highest ranked permutation is to be arranged in the layout.

Merit tables (128) are may be populated for the deepest layers of the layout first, starting with the merit tables of elements that are the sole contents of containers. Then those merit tables are used at least in part with merit tables for the remaining elements to derive the merit tables for the remaining containers, working progressively layer by layer. When a container is reached for which the contents may be laid-out in a specific space, the second role of the layout system for that container can begin. For example, layout permutations can be scored and ranked to determine the highest scoring permutation for that container, and the shapes of the elements and containers that it contains can then be assigned specific spaces within the layout according to the arrangement of that permutation. Any containers that are assigned specific spaces can then be laid-out in the same manner, and so on down through the layers.

In some examples, the layout system (106) automatically determines the layout without involvement from a user after the user has selected those elements to be included in the layout. In other examples, the user has an option to edit the layout after the layout system (106) has created a layout. In such cases, the layout system (106) can apply a learning mechanism to fine tune its scoring policy, other policies, and rules to reflect how the user or users are editing the layout. In yet other examples, the layout system (106) gives the user the option to select from a preselected group of layout permutations that are deemed acceptable for the final product.

The layout system (106) may be incorporated for end consumers who wish to arrange personal items. For example, the layout system (106) may be part of a package that is downloaded onto the user's user interface (102). In other examples, the layout system (106) is integrated into a retailer's website or brick and mortar store where a consumer can upload personal elements to be arranged in a layout. In yet other examples, the layout system (106) is incorporated into a business that publishes magazines, flyers, books, newspapers, periodicals, publications, other published items, or combinations thereof. In yet other examples, the layout system (106) is incorporated into a business that creates websites or portal pages. In any of the, the layout system (106) may include an engine to gather elements from throughout the internet to integrate into the layout. For example, a web portal may include a finance section, and the engine obtains from the internet information about current stocks, interest rates, mortgage rates, other real time financial information, or combinations thereof to populate a container of a web portal layout. Another section of the web portal may include recent news, and the engine may gather news articles, news titles and hyperlinks to title's source, or other news information to populate a portal of a web portal layout. Other web portal containers may be dedicated to recently released movies, sports news, political events, weather, other features, or combinations thereof.

Figure 2:
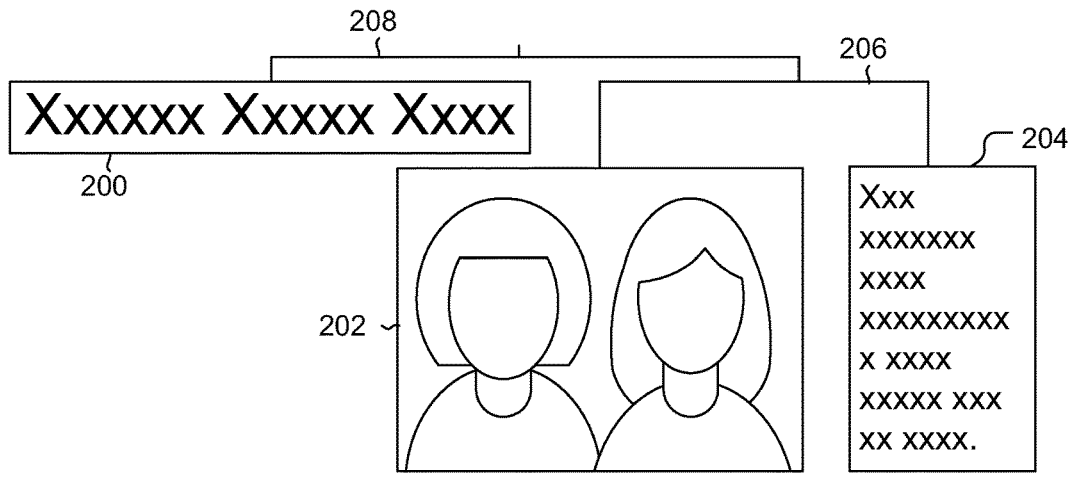
FIG. 2 is a diagram of an example of elements and containers according to the principles described herein.

FIG. 2 is a diagram of an example of elements (200, 202, 204) and containers (206, 208) according to the principles described herein. In this example, element (200) is a title element that contains text for a title to be displayed in a first container (208). Element (202) is an image element that contains faces. Element (204) is a text element that contains text to be associated with the image. The elements (202, 204) can be sized, shaped, cropped, or otherwise modified to fit within second container (206). A second container (206) and element (200) can be sized, shaped or otherwise modified to fit within the first container (208). The first container (208) stores the attributes table and merit table of the element (200) and the second container (206). The second container (206) stores the attributes table and merit table of the elements (202, 204). Thus, each container can select those layout attributes and shape descriptors that have high merit value when determining how to size, shape, crop, or otherwise modify the elements for displaying together in the container. In some examples, the containers (206, 208) may not be visible in the display with the other elements.

Figure 3:
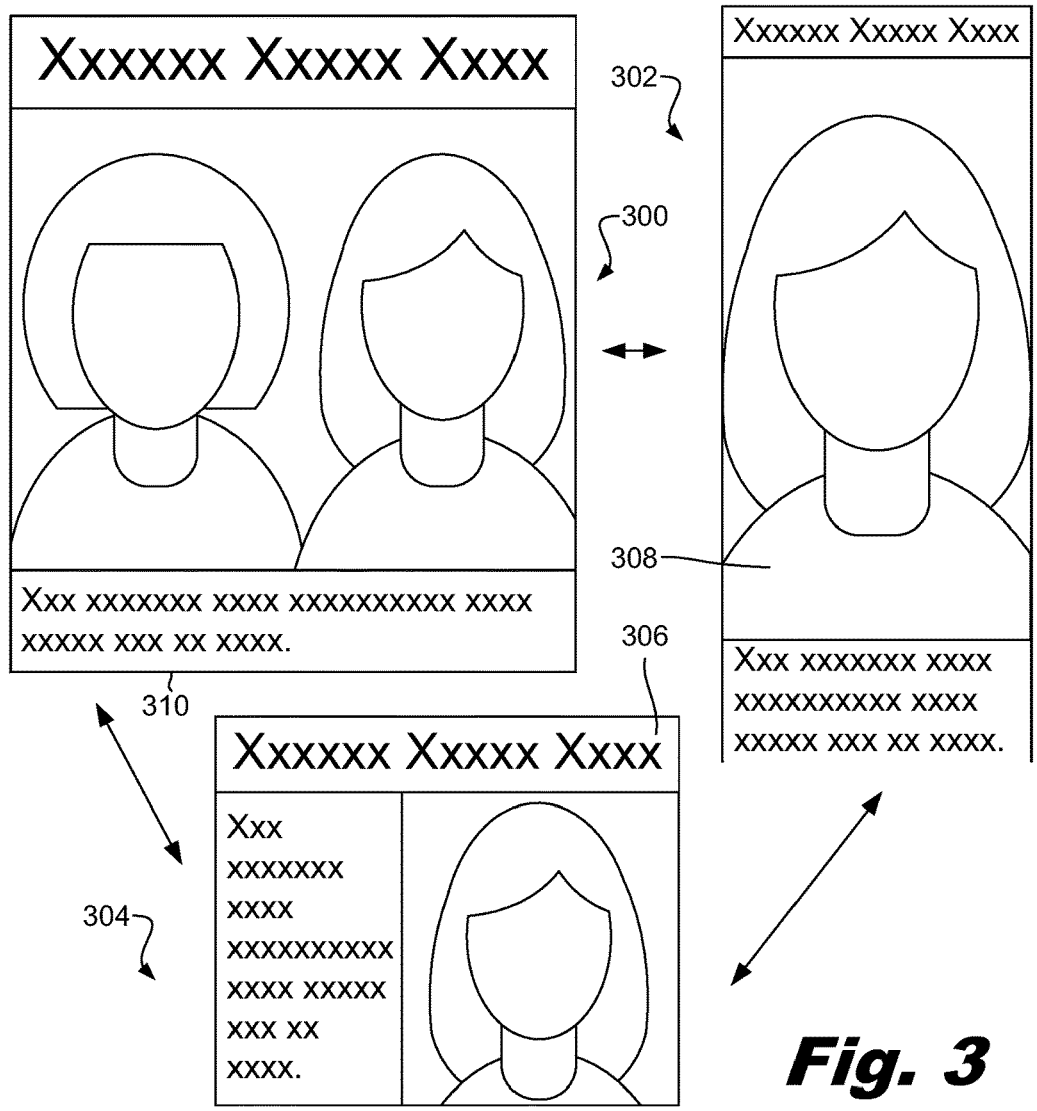
FIG. 3 is a diagram of an example of permutations of arrangements of multiple elements according to the principles described herein.

FIG. 3 is a diagram of an example of permutations (300, 302, 304) of arrangements of multiple elements (306, 308, 310) according to the principles described herein. Elements (306, 308, 310) correspond to elements (200, 202, 204) in containers (206, 208) in FIG. 2. In each permutation (300, 302, 304), the elements (306, 308, 310) are shaped, sized, cropped, or otherwise modified to arrange each of the elements (306, 308, 310) in such way so that each of the elements (306, 308, 310) is displayed with high merit value.

For example, a first element (306) is a title element. The font of the first element (306) has a relatively large font size in the first permutation, while having a smaller font in the second permutation and having an even smaller font in the third permutation. The font size of the first element (306) in each of the permutations (300, 302, 304) depends on the width of the first element (306) in each of the permutations (300, 302, 304) and is determined such that the title fills substantially the whole of the width. The font size is a layout attribute of the first element (306). Each font size in the permutations (300, 302, 304) has at least some merit value. However, a merit policy may determine that the font size of the second permutation (304) has the highest merit value, while the larger font of the first permutation (300) has a lower merit value, and the font size of the third permutation (302) has the lowest merit value. The merit table of the first element (306) has merit values associated with a range of shape descriptor values. The merit values for shape descriptors are at least partially determined by the merit values of the font sizes for the title to fill the widths of the corresponding shapes. If the font size for a shape descriptor value has no merit value, the merit value of that shape descriptor value will be zero and the corresponding shape will not be considered as a valid shape option for layouts of the first element (306).

Element (308) is an image element. In the first permutation (300), the second element (308) is slightly cropped to remove some background and no faces or hair is cut off. Shape descriptor values that allow both faces to stay in the image may render the highest merit scores. However, in the second and third permutations (302, 304), the second element (308) is cropped such that one of the faces is removed from the image. In the second permutation (304), the image is cropped such that some background space remains in the image to the sides of the face. Such a crop placement may render a higher merit score than the crop placement of the third permutation (302) where the crop placement is right next to the hair and leaves no background to the sides of the face.

Element (310) is a text element that has a consistent font size throughout each of the permutations (300, 302, 304). Here, the shape of the element (310) affects how many words are on each line. As a result, the third element (310) in each permutation (300, 302, 304) has different amounts of white space, which is influenced by the different sized words of the text. In one example, the merit values associated with different values of shape descriptor for the third element (310) may be determined according to the amount of white space within the corresponding shape of the third element (310). The merit value may be high for shapes that leave minimal white space and low for shapes that leave large amounts of white space.

While this example has been described with reference to specific attributes of each of the elements, other attributes are exhibited in depicted permutations, such as font size, element size, element shape, crop line placements, colors, other attributes, and combinations thereof. Also, while this example has been described with reference to specific arrangements of permutations, many additional arrangements are possible such that each of the elements has a shape descriptor with at least some merit value.

While the depicted permutations each have elements that are displayed with a merit value above zero, the merit value for each of the elements is not equal. Some of the elements may exhibit high levels of merit value while other elements exhibit lower levels of merit value within the same container. A score engine may cause each of the containers to be assigned an aesthetic score based on a scoring policy. In some examples, the highest aesthetic score may be based on the collective value of the merit value of each of the elements within the container. However, in other examples, the aesthetic score is based on other factors such as the amount of white space unfilled by any of the elements in the container. The score engine may allow a single best permutation to be selected as the final layout of a container. It may also provide a range of scores for different layout permutations. The scores of those permutations can derive merit values for a corresponding range of shape descriptor values for the container. Thus, the layout permutations of a container can derive a merit table to be used when the container is laid-out within another container. For example, permutations of the image (308) and the text (310) including the three displayed permutations (300, 302, 304) can be scored to derive merit values in a merit table for a container of the image and text elements. The merit table of that container and the merit table of the title (306) can then be used to derive permutations and scores for the overall layouts of the three elements and containers as depicted in FIG. 3.

Figure 4:
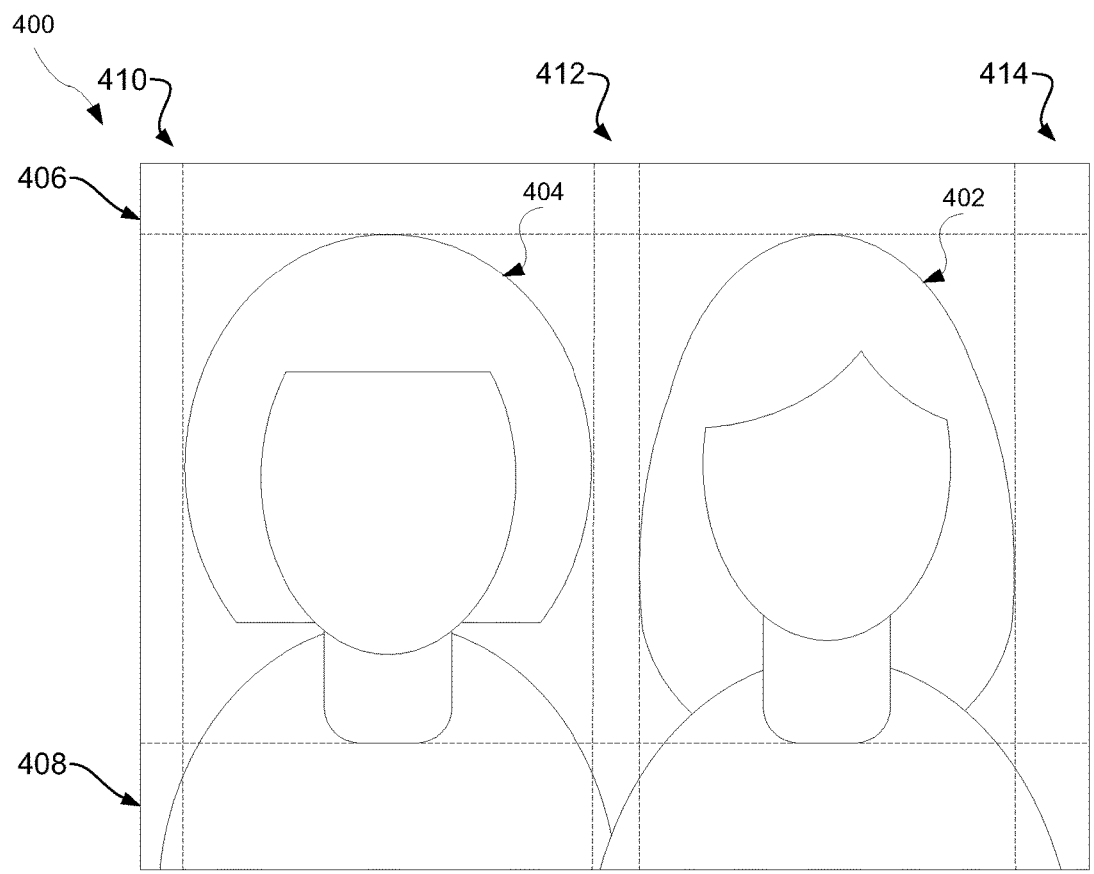
FIG. 4 is a diagram of an example of an image element according to the principles described herein.

FIG. 4 is a diagram of an example of an image element (400) according to the principles described herein. In this example, the image element (400) includes a first face (402) and a second face (404) in the background. According to a merit policy, a vertical crop line or a horizontal crop line through a region that contains a head of an individual has no merit value. Thus, just horizontal regions (406, 408) and vertical regions (410, 412, 414) are acceptable for crop line placements to have some merit value. Within those horizontal regions (406, 408) and vertical regions (410, 412, 414), crop line placements will still render different merit values depending on the factors of a merit policy, such as the amount of remaining background space, whether one of the faces is removed, other factors, and combinations thereof. While this example is described with acceptable regions for crop lines falling outside of the hair associated with the faces (402, 404), in other examples, the merit policy may still assign some value to the images with crop lines positioned through the hair, but not the face. In some examples, a user has an option to specify and/or modify the rules for merit value. In other examples, a merit policy is predetermined.

Figure 5:
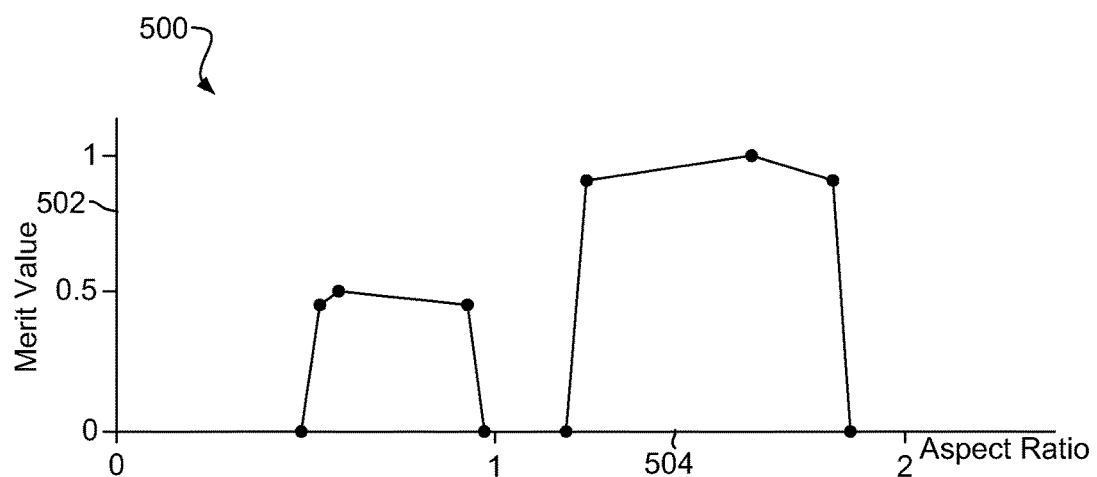
FIG. 5 is a chart of an example of merit values associated with a shape attribute of an element according to the principles described herein.

FIG. 5 is a chart (500) of an example of merit value associated with a shape attribute of an element according to the principles described herein. In this example, the vertical axis (502) represents merit value and the horizontal axis (504) represents an aspect ratio of the element's size. Aspect ratio is the result of dividing the width of a permutation of an element by the corresponding height and in this example, aspect ratio has been chosen as the shape descriptor of the merit table. The chart (500) depicts the relationship between merit values and shape descriptor values in the merit table for the image element (400, FIG. 4) described above.

The merit value may be determined based on a merit policy that considers multiple factors to measure how suitable the element's attributes are for display. The factors may include the size of an image, the pixel density of the image, the clarity of the image, where cross lines intersect an image, the amount of background space in an image, the overall aesthetic look of an image, other factors, or combinations thereof.

In this example, the merit value measured between a 1.0 and a 0.0 where a score of 1.0 is the highest value of merit value and a score of 0.0 indicating that there is no merit value. However, the merit values may be measured on various different absolute or relative scales according to the principles described herein. In this example, the merit policy is such that a high merit value is associated with a shape descriptor that allows both faces to be included, with crop lines that are not too close to the faces. The highest merit value satisfied these conditions and also has an aspect ratio with a value equal to the golden ratio.

The range of suitable aspect ratios for the image element (400, FIG. 4) is discontinuous. For example, an aspect ratio of about 0.5 to approaching 1.0 has greater merit value. However, at an aspect ratio of 1.0, the image element (400, FIG. 4) has a merit value of zero. This is because there is no acceptable crop of element (400, FIG. 4) that will give an aspect ratio of 1.0. But, just before about an aspect ratio of 1.25 the merit value of the image element (400, FIG. 4) dramatically increases before returning to zero at an aspect ratio of 2.0.

Figure 6:
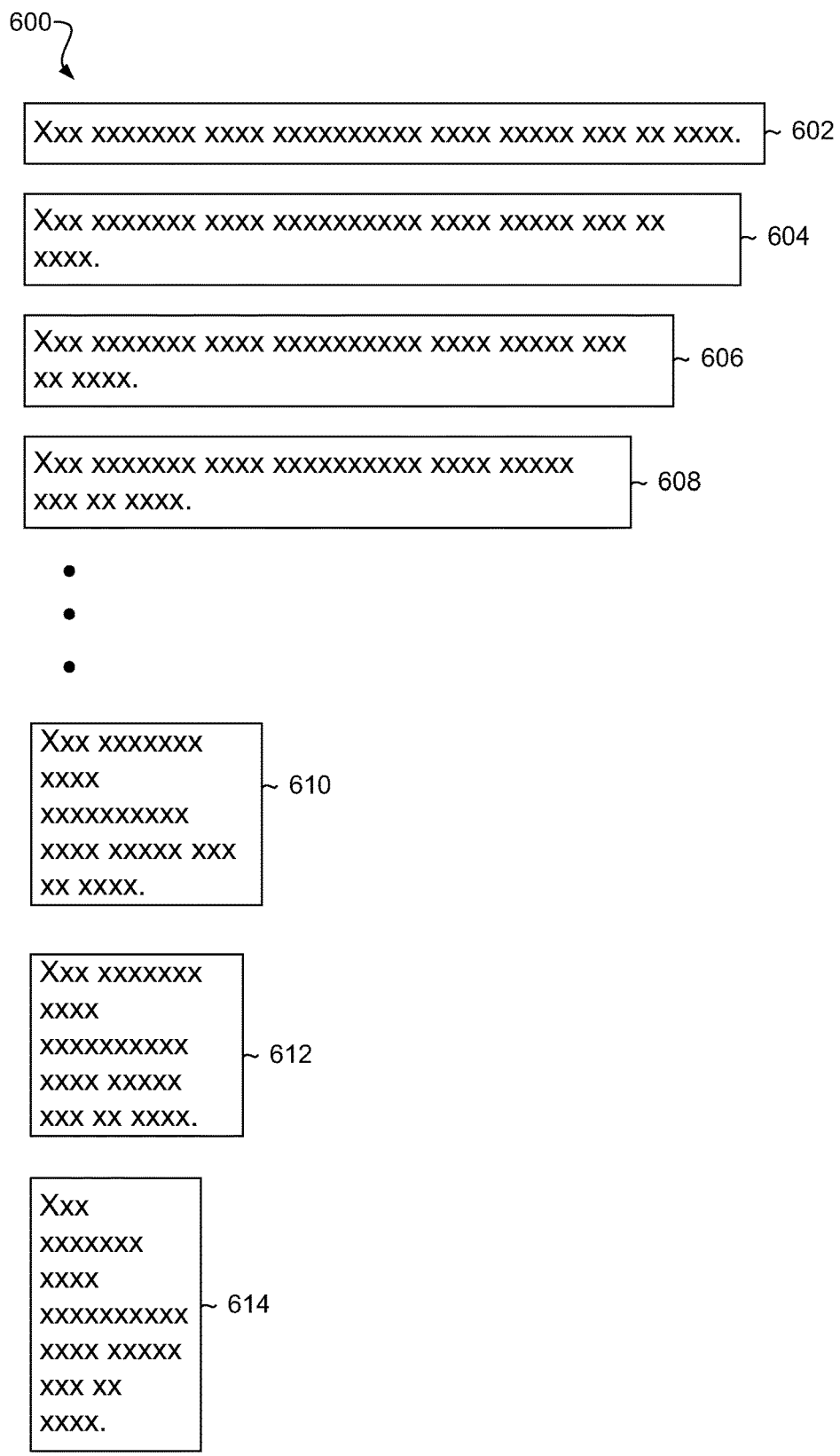
FIG. 6 is a diagram of an example of permutations of a text element according to the principles described herein.

FIG. 6 is a diagram of an example of permutations of a text element (600) according to the principles described herein. In this example, the same text element (600) is depicted in different permutations (602, 604, 606, 608, 610, 612, 614). Each permutation (602, 604, 606, 608, 610, 612, 614) has varying widths.

The text element (600) has a group of words, each word being a set block of communication characters. The communication characters may be alphanumeric characters, characters of any appropriate written language, symbols, numbers, other communications characters, or combinations thereof. The communication characters of each set block are locked together such that the entire set block resides together on a single line of text. As the width of the text element changes, the width will be able to accommodate a different number of set blocks that are sequentially arranged to convey a message. As the text element's width shrinks, less set blocks will fit on a single line of text, but more lines of text are made to accommodate all of the set blocks, thus the height of the text element (600) increases. As the width enlarges, more set blocks are included per line of text, and fewer lines of text are used and the height correspondingly decreases. As the set blocks move from one line of text to another, the communication characters of the set block move together and are not spilt. For example, a set block containing communication characters of "computer" will reside on a single line of text. Thus, the communication characters will be not spilt between different lines of text as the text element's width changes across permutations.

In other examples, a word may have multiple set blocks that have the ability to be hyphenated to each other. For example, the word "mailbox" can have a first set block that includes the communication characters "mail," and a second set block that includes the communication characters "box." Thus, the first and the second set blocks can reside on different lines of text with a hyphen inserted sequentially between them.

The width of the text element (600) contributes to determining how many lines of text are in the text element (600). For example, permutation (602) has the longest width and has a single line. Permutation (602) may have a high merit value because its width allows for a tight containment of the set blocks of text and reduces the amount of white space in the text element.

Permutation (604) has a slightly shorter width that causes one of the set blocks of text to form a new line. Such a new line increases the overall height of the text element (600). However, since just a single set block is on the second line of text, permutation (604) is left with a lot of white space. As a result, the width of permutation (604) may have a significantly lower merit value than the width of permutation (602). In permutations (606, 608), the width decreases, but the merit value increases because as more set blocks are moved to the second line of text, less white space is present in the text element (600). Thus, the merit value's direction varies as the width changes.

The appropriate layer in the layout that will contain the text element (600) will also store the merit table that associates merit values with the shape descriptor values that correspond to the text layout permutations depicted in FIG. 6. In this manner, the layout or container containing the text element (600) can communicate with the layout system to determine the permutations that have the most merit value and to prevent sizing the text element (600) in a layout or sub-layout that falls outside of the acceptable ranges.

Figure 7:
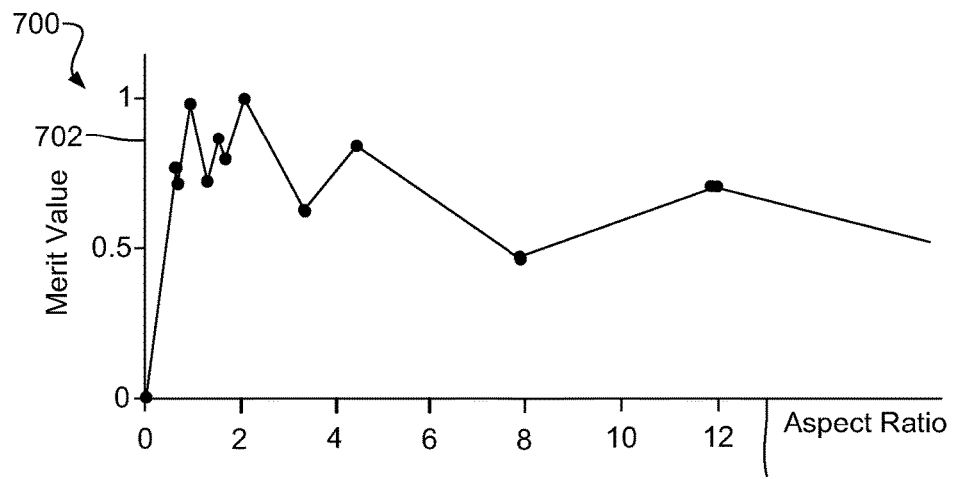
FIG. 7 is a chart of an example of merit values associated with a shape attribute of an element according to the principles described herein.

FIG. 7 is a chart (700) of an example of merit value associated with a shape attribute of an element according to the principles described herein. In this example, the vertical axis (702) represents merit value and the horizontal axis (704) represents the aspect ratio of the text element. The chart (700) depicts the relationship between the merit values and the shape descriptor values in the merit table for the text element (600, FIG. 6) described above, in which aspect ratio has been chosen as the shape descriptor. In this example, the merit values of the text element (600, FIG. 6) frequently change direction as the aspect ratio value changes. Here, each permutation with a different aspect ratio has merit value, but the merit value fluctuates.

The peaks in the chart (700) correspond to the tightest bounding around text distributed over different numbers of text lines. Downward slopes to the left correspond to increasing amounts of white space above or below the text. Downward slopes to the right correspond to increasing amounts of white space to the left or right of the text. The text may not in some cases be allowed to span arbitrary widths. Unlike images, if the text has a fixed point size, the aspect ratio cannot be maintained for different scales of the element.

Figure 8:
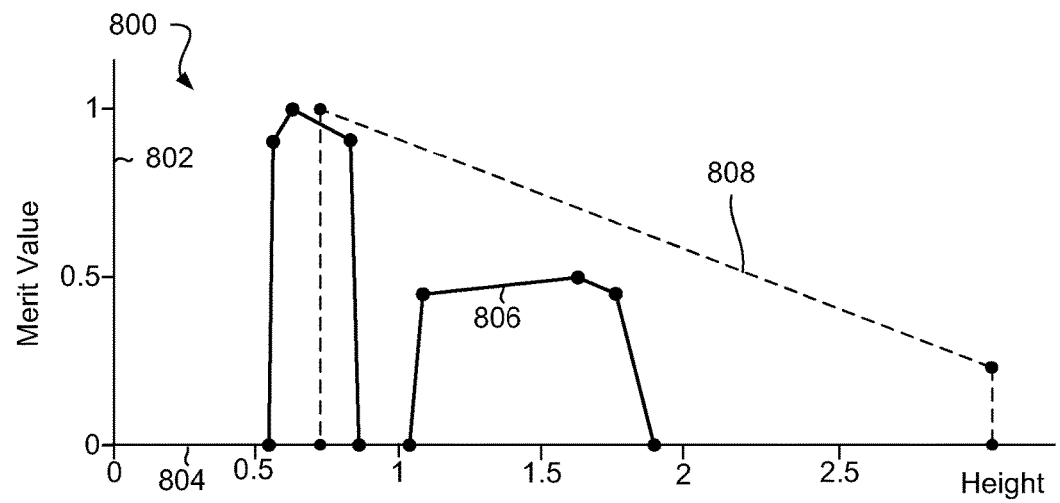
FIG. 8 is a chart of an example of merit values associated with a shape attribute of elements according to the principles described herein.

FIG. 8 is a chart (800) of an example of merit value associated with a shape attribute of elements according to the principles described herein. In this example, the vertical axis (802) represents merit value and the horizontal axis (804) represents the height of layout permutations of the elements. The chart (800) relates to a columnar layout of three columns. They layout includes a text element and an image element in a container for which height has been chosen as a shape descriptor. The container will store three merit tables for each element. The first merit table will associate merit values with element heights for an element with a fixed width of one column. The second table will be for a fixed width of two columns, and the third table will be for a fixed width of three columns.

Further, in this example, the dashed line (808) depicts the relationship between merit value and shape descriptor values for the text element (600, FIG. 6) constrained to occupy a fixed width of two columns as in the second merit table for the element. The solid lines (806) depict the relationship between merit value and shape descriptor values for the image element (400, FIG. 4) constrained to occupy a fixed width of one column as in the first merit table for the element. The merit values are shown together such that they are vertically aligned so that the merit values of text and image elements of equal heights can be seen at the same point on the horizontal axis (804).

Figure 9:
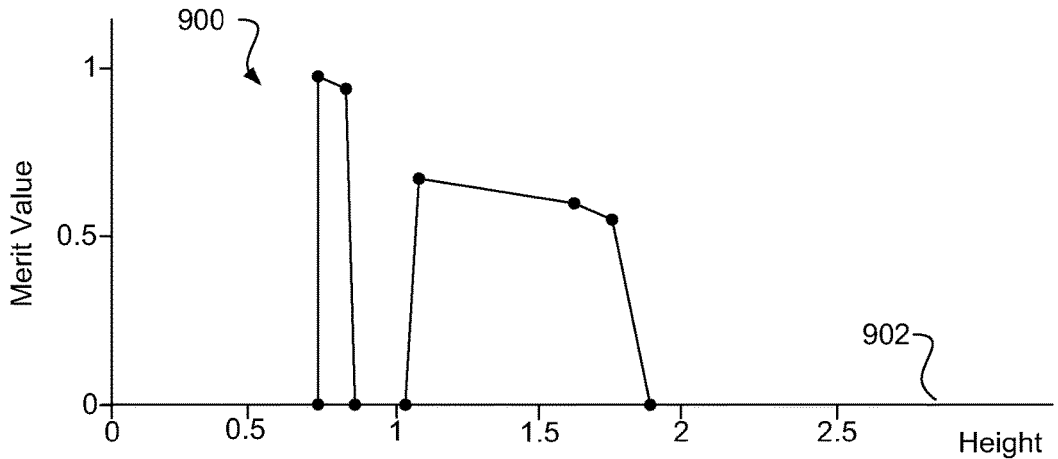
FIG. 9 is a chart of an example of merit values associated with a shape attribute of elements according to the principles described herein.

FIG. 9 is a chart (900) of an example of merit value associated with a shape attribute of elements according to the principles described herein. FIG. 9 depicts the same image element (400, FIG. 4), text element (600, FIG. 6) and container that are described above in relation to FIG. 8. In this case, the layout is such that the image and text elements are to be aligned horizontally side-by-side with a common height. The sum of the width of the elements should be equal to the width of the container.

Further, FIG. 9 depicts a merit table for the side-by-side arrangement of the image and text elements that is derived from the merit tables of the two elements depicted in FIG. 8 above. In this case, the combined merit value can be derived simply. At each point along the horizontal axis (902), the combined merit value is a weighted average of the element merit values (in this case with unit weights) and wherever one or other element merit values is zero, the combined merit value also drops to zero.

Other combinations such as a top-to-bottom vertical alignment of the two elements with a common width can also be derived from the merit tables of the two elements, and successive pairwise horizontal and vertical combinations can build up more complex arrangements of larger numbers of contents. Whenever layout policies allow it, it is preferable to compute combined merit tables directly from the individual merit tables of the contents being laid out rather than by considering the individual permutations of particular shapes and arrangements of contents.

Figure 10:
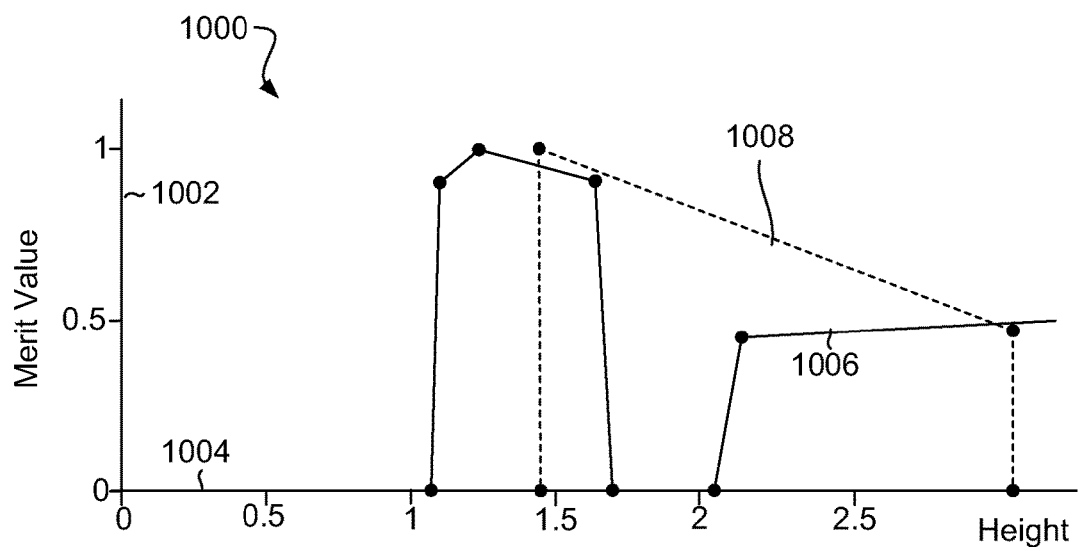
FIG. 10 is a chart of an example of merit values associated with a shape attribute of elements according to the principles described herein.

FIG. 10 is a chart (1000) of an example of merit value associated with a shape attribute of elements according to the principles described herein. In this example, the vertical axis (1002) represents merit value and the horizontal axis (1004) represents the height of layout permutations of the elements. The chart relates to the same columnar layout as described in relation to FIGS. 8 and 9.

Further, in this example, the dashed line (1008) depicts the relationship between merit value and shape descriptor values for the text element (600, FIG. 6) constrained to occupy a fixed width of one column, and the solid lines (1006) depict the relationship between merit value and shape descriptor values for the image element (400, FIG. 4) constrained to occupy a fixed width of two columns. The merit values are shown together such that they are vertically aligned so that the merit values of text and image elements of equal heights can be seen at the same point on the horizontal axis (1004).

Figure 11:
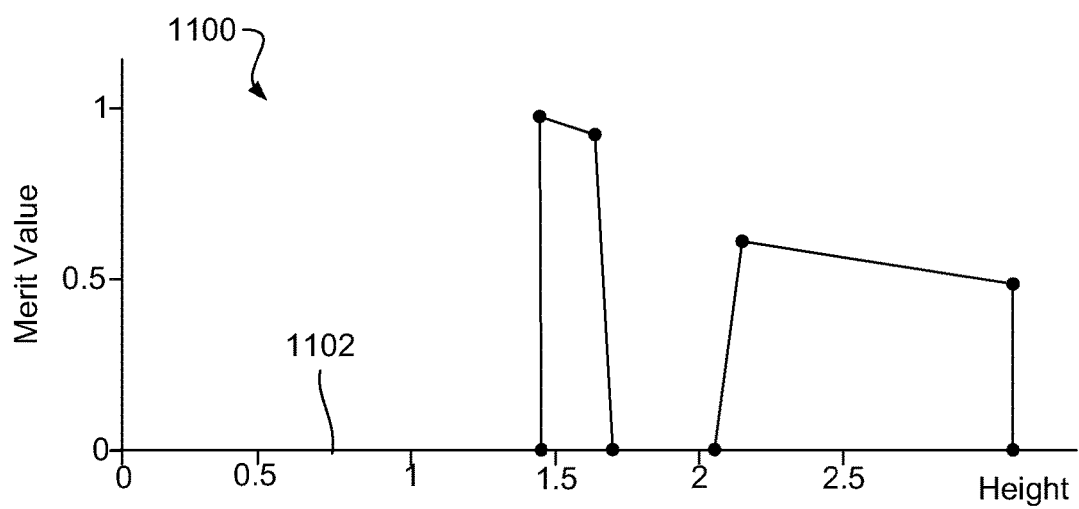
FIG. 11 is a chart of an example of merit values associated with a shape attribute of elements according to the principles described herein.

FIG. 11 is a chart (1100) of an example of merit value associated with a shape attribute of elements according to the principles described herein. In this example, an alternative permutation of the same layout as depicted in the chart (900, FIG. 9) described above is depicted. Here, the image and text elements are aligned horizontally side-by-side with a common height, but with different widths. At each point along the horizontal axis (1102), the combined merit value is derived from the element merit values as described in the example of FIG. 9. In some cases, it may be computationally preferable to compute new merit values from the aesthetic scores of permutations rather than by combining the merit tables of the elements being laid-out. In other cases, another layout attribute may impose a constraint that limits the ways the elements' merit values are combined or aesthetic scores might be used to control the weightings applied to the element merit values when they are combined.

In general, layouts proceed upwards from the bottom of the layout hierarchy while populating and then combining merit tables. In some examples, if the tables are encoded as piecewise linear approximations for a continuous merit function, the computations for combining the merit functions can be reduced considerably. These combinations can provide a rapid way to propagate ranges and merit values up the hierarchy while encompassing increasing numbers of potential layouts. In some cases, just the container for the top-level layout has a specific layout area identified. Once the merit tables are propagated to the top level where the layout area is determined, the final layout decisions are made. For example, one such final layout decision may include selecting the highest ranking permutation where the scores are based on the accuracy of the fit of the layout to the available area. That decision divides the available space amongst the sub-layouts and allows final decisions to be taken at the next level down, and so on. In some cases, final decisions are based entirely on the merit tables. For example, a policy may include a rule that indicates that in the absence of any other relevant constraints, the permutation to select for a layout is the one with the highest merit value.

Figure 12:
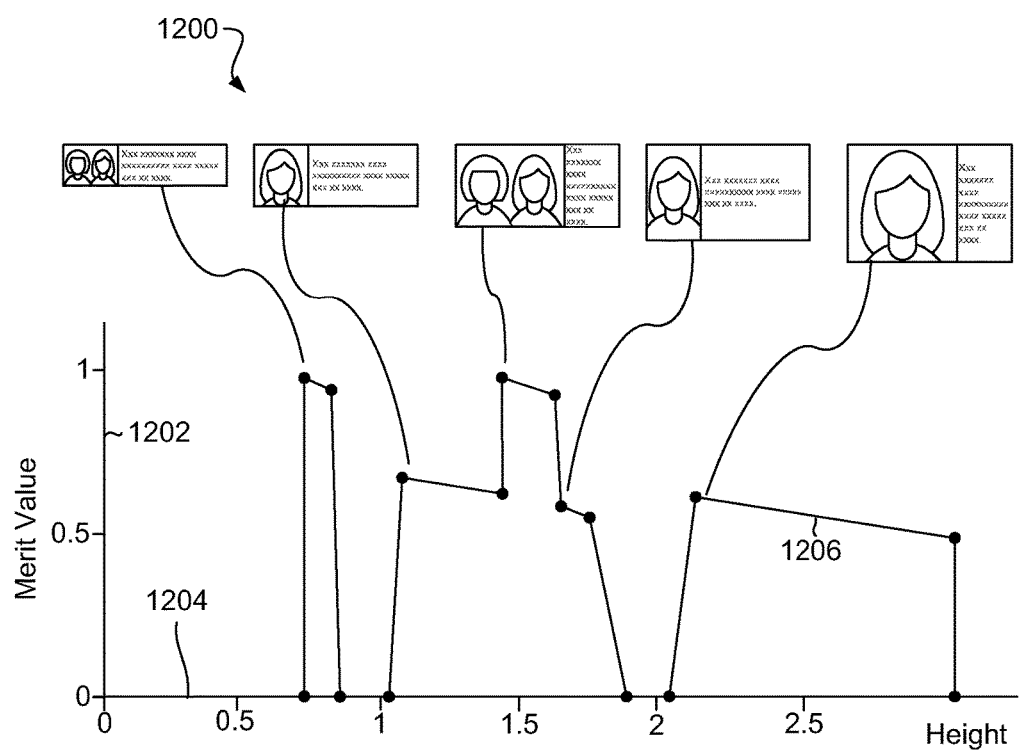
FIG. 12 is a chart of an example of merit values associated with a shape attribute of an element according to the principles described herein.

FIG. 12 is a chart (1200) of an example of merit value associated with a shape attribute of an element according to the principles described herein. In this example, the vertical axis (1202) represents merit value and the horizontal axis (1204) represents height. The solid lines (1206) represent the relationship between merit value and shape descriptor values for a container of the text element (600, FIG. 6) and the image element (400, FIG. 4), such container being constrained to occupy a fixed width of three columns with a layout policy that has the contained elements placed side-by-side to occupy the full width and to share a common height.

In this example, the chart (1200) depicts the combined merit tables of two different permutations of the same layout. Here, the combination of the highest merit values for corresponding heights of the merit values in the examples described in connection to FIGS. 9 and 11 are depicted. In general, the combination of merit tables for a plurality of permutations of the same layout can include relative weightings so that the merit values of one permutation are considered to have greater proportional merit value than those of another permutation. If just the two permutations depicted in FIGS. 9 and 11 are allowable for a layout, the merit table depicted in FIG. 12 is the merit table that would be used at the next level up the containment hierarchy to derive a higher level merit table or a specific layout. When the total area for this layout is determined, the merit table can be used to select the final layout by determining which permutation provides the highest merit value for the given height. As demonstrated with the above examples, the upwards propagation of merit values for a wide range of permutations provides efficiency when determining the overall layout.

Figures 13, 14:
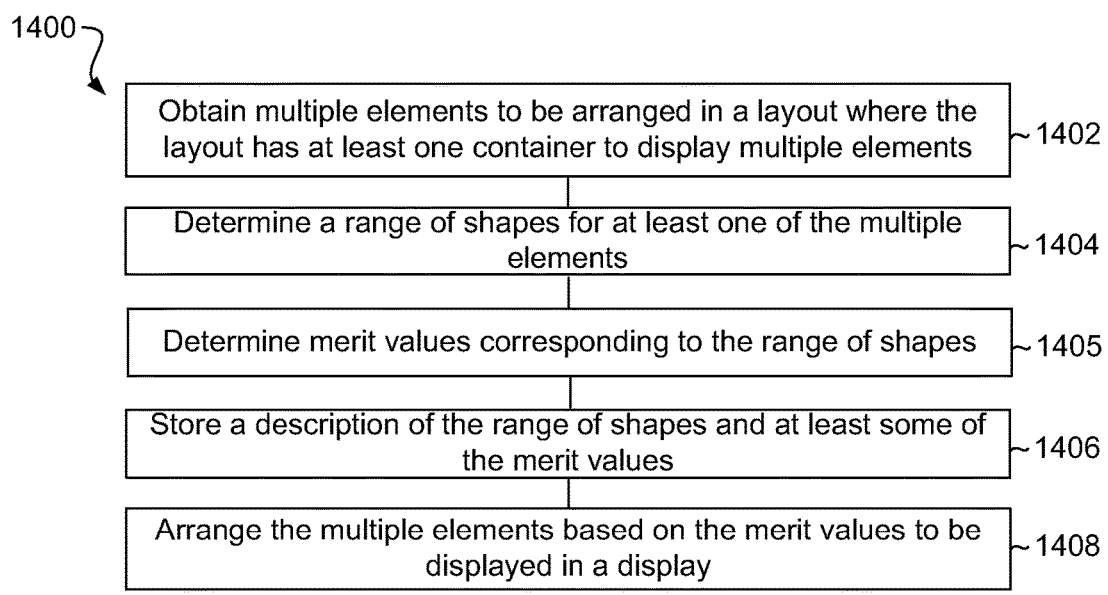
FIG. 13 is a diagram of an example of rankings according to the principles described herein.
FIG. 14 is a diagram of an example of a method for arranging elements in a layout according to the principles described herein.

FIG. 13 is a diagram of an example of rankings (1300) according to the principles described herein. In this example, a chart (1302) has a column (1304) listing identification numbers of permutations, a column (1306) with an aesthetic score, and a column (1308) with the ranking. Column (1304) depicts four identification numbers. However, any appropriate number of permutations may be included according to the principles described herein. For example, a likely implementation of the principles described herein will include hundreds of permutations.

Each of the permutations is given an aesthetic score based on an aesthetic scoring policy. Each of the permutations in the chart (1302) just contains characteristics that are within the acceptable ranges. However, merely having characteristics that stay within the acceptable range of attributes is a first pass to being selected. Among the acceptable permutations, some of the permutations will have better aesthetics than others. Thus, the aesthetics scoring policy applies rules intended to identify which of the acceptable permutations should be considered for being in the final product.

Column (1308) includes the ranking (1300) based on the aesthetic score. Thus, the permutation with the highest score has the highest rank. A layout policy may include a rule that indicates that the highest ranked permutation will be the permutation that will be included in the final product. However, in other examples, other factors, other than just the highest aesthetic score, are considered when the layout system selects a permutation.

Such an aesthetic score may consider the same characteristics as considered with the merit tables described above. In other examples, the aesthetic score may consider additional factors not accounted for with the merit tables. For examples, the merit tables may just consider shape descriptors while the aesthetic score considers additional factors.

FIG. 14 is a diagram of an example of a method (1400) for arranging elements in a layout according to the principles described herein. In this example, the method (1400) includes obtaining (1402) multiple elements to be arranged in a layout where the layout has at least one container to display multiple elements, determining (1404) a range of shapes for at least one of the multiples elements, determining (1405) merit data that describes merit values corresponding to said range of shapes, storing (1406) a description of the range of shapes and at least some of the merit data, and arranging (1408) the multiple elements based on the merit data to be displayed in a display.

The layout may be part of a magazine layout, a website layout, a portal layout, a page layout, a photo layout, a text layout, other type of layout, or combinations thereof. Arranging the layout is based on a layout policy. The layout policy has a set of rules that determine how the layout will be arranged. One such rule may include arranging an overall layer of the layout prior to arranging a sub-layout in the container. Another such rule may include that a highest ranked permutation is to be arranged in the layout.

The characteristics that can affect the merit value of the attributes includes characteristics affected by cropping the element, characteristics affected by changing a size of the element, characteristics affected by changing a shape of the element, characteristics affected by moving the set block from a first line of text to a second line of the text, other characteristics, or combinations thereof.

The permutations include different arrangements of the layout with different sizes of the containers and/or different sizes of the elements. The discontinuous ranges of acceptable attributes include an acceptable element size, an acceptable element width, an acceptable element height, an acceptable element shape, an acceptable cropping region of an element, or combinations thereof based on an acceptance policy.

Figure 15:
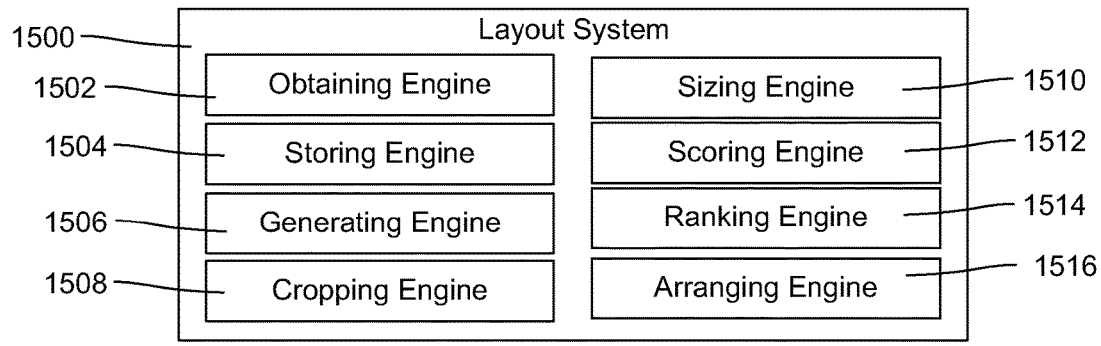
FIG. 15 is a diagram of an example of a layout system according to the principles described herein.

FIG. 15 is a diagram of an example of a layout system (1500) according to the principles described herein. In this example, the layout system (1500) includes an obtaining engine (1502), a storing engine (1504), a generating engine (1506), a cropping engine (1508), a sizing engine (1510), a scoring engine (1512), a ranking engine (1514), and an arranging engine (1516). The engines (1502, 1504, 1506, 1508, 1510, 1512, 1514, 1516) refer to a combination of hardware and program instructions to perform a designated function. Each of the engines (1502, 1504, 1506, 1508, 1510, 1512, 1514, 1516) may include a processor and memory. The program instructions are stored in the memory and cause the processor to execute the designated function of the engine.

The obtaining engine (1502) obtains the elements to be included in the layout. The obtaining engine (1502) may search for elements that have specified characteristics, receive elements that are sent to it, select elements according to a selection policy, or combinations thereof.

The storing engine (1504) stores information in the layout about the ranges and their associated values. The storing engine may store the ranges in an attributes table and the merit data in merit tables within the container that holds the elements. Each container may have its own attributes table for each of the elements contained therein.

The generating engine (1506) generates the permutations that have characteristics that include just attributes within the acceptable ranges. A cropping engine (1508) crops elements, such as image elements, for each of the permutations. The sizing engine (1510) sizes the elements for the permutations. The cropping engine (1508) and the sizing engine (1510) keep the elements within the ranges that have been classified as acceptable.

The scoring engine (1512) scores the permutations based on an aesthetic scoring policy. The ranking engine (1514) ranks the permutations based on their aesthetic score. The arranging engine (1516) arranges the layout with the permutation determined with the layout policy.

Figure 16:
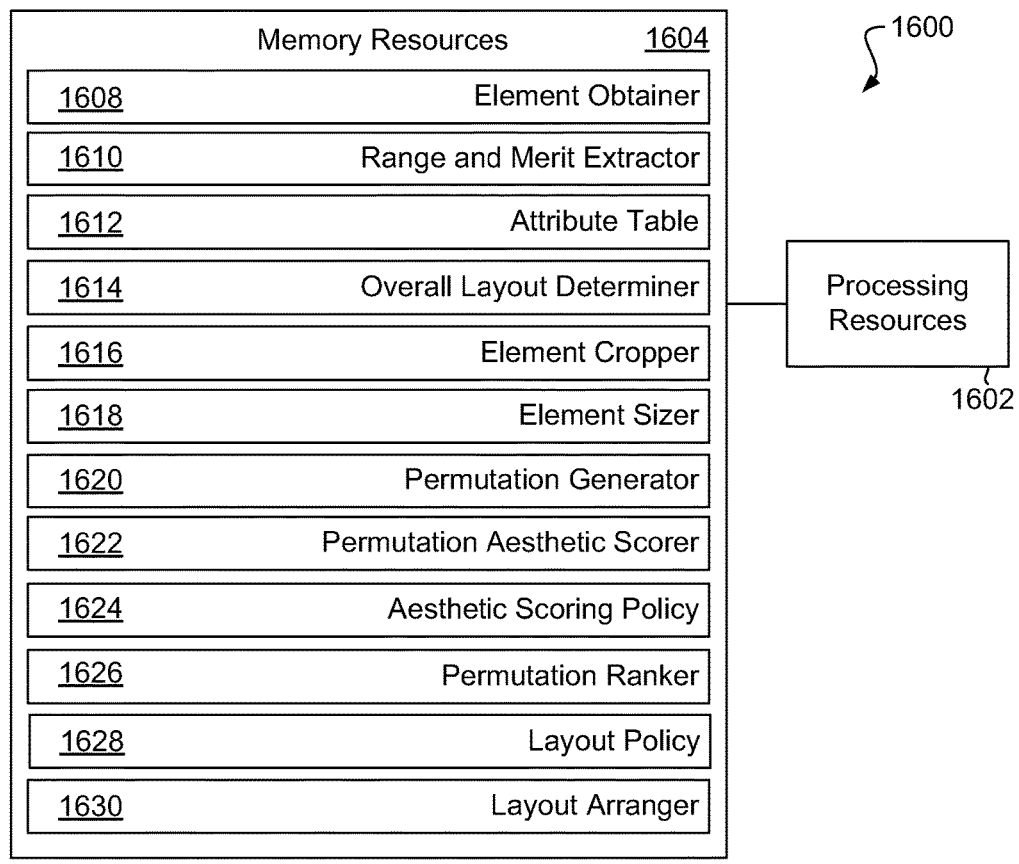
FIG. 16 is a diagram of an example of a layout system according to the principles described herein.

FIG. 16 is a diagram of an example of a layout system (1600) according to the principles described herein. In this example, the layout system (1600) includes processing resources (1602) that are in communication with memory resources (1604). Processing resources (1602) include at least one processor and other resources used to process programmed instructions. The memory resources (1604) represent generally any memory capable of storing data such as programmed instructions or data structures used by the layout system (1600). The programmed instructions shown stored in the memory resources (1604) include an element obtainer (1608), a range and merit extractor (1610), an overall layout determiner (1614), an element cropper (1616), an element sizer (1618), a permutation generator (1620), an permutation aesthetic scorer (1622), an permutation ranker (1626), and a layout arranger (1630). The data structures shown stored in the memory resources (1604) include an attributes table (1612), an aesthetic scoring policy (1624), and a layout policy (1628).

The memory resources (1604) include a computer readable storage medium that contains computer readable program code to cause tasks to be executed by the processing resources (1602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The element obtainer (1608) represents programmed instructions that, when executed, cause the processing resources (1602) to obtain elements to be populated in the layout. The range and merit extractor (1610) represents programmed instructions that, when executed, cause the processing resources (1602) to extract information from the elements to be populated in the layout about the range of attributes and their associated merit value. The extracted information is stored in the attributes table (1612). The overall layout determiner (1614) represents programmed instructions that, when executed, cause the processing resources (1602) to determine how to arrange the overall layout, which may contain determining how to arrange containers in the layout. The element cropper (1616) represents programmed instructions that, when executed, cause the processing resources (1602) to crop elements for permutations in such a manner that the permutations have characteristics that have high merit value. The element sizer (1618) represents programmed instructions that, when executed, cause the processing resources (1602) to size elements for permutations in such a manner that the permutations have high merit value. The permutation generator (1620) represents programmed instructions that, when executed, cause the processing resources (1602) to generate permutations of the layout with the elements sized and/or cropped with the element cropper (1616) and/or element sizer (1618).

The permutation aesthetic scorer (1622) represents programmed instructions that, when executed, cause the processing resources (1602) to score the permutations based on the aesthetic scoring policy (1624). The aesthetic scoring policy (1624) may contain rules that score individual elements and an overall permutation. The overall permutation score may include some of the elements having individual scores that are less than their optimum score, but taken collectively with the other elements and other factors, the overall aesthetic value is greater.

The permutation ranker (1626) represents programmed instructions that, when executed, cause the processing resources (1602) to rank the permutations based on their aesthetic scores. The layout arranger (1630) represents programmed instructions that, when executed, cause the processing resources (1602) to arrange the layout based on the layout policy (1628).

Further, the memory resources (1604) may be part of an installation package. In response to installing the installation package, the programmed instructions of the memory resources (1604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (1602) and the memory resources (1604) are located within the same physical component, such as a server, or a network component. The memory resources (1604) may be part of the physical component's main memory, caches, registers, non-volatile memory, or elsewhere in the physical component's memory hierarchy. Alternatively, the memory resources (1604) may be in communication with the processing resources (1602) over a network. Further, the data structures, such as the libraries and may be accessed from a remote location over a network connection while the programmed instructions are located locally. Thus, the layout system (1600) may be implemented on a user device, on a server, on a collection of servers, or combinations thereof.

The layout system (1600) of FIG. 16 may be part of a general purpose computer. However, in alternative examples, the layout system (1600) is part of an application specific integrated circuit.

Figure 17:
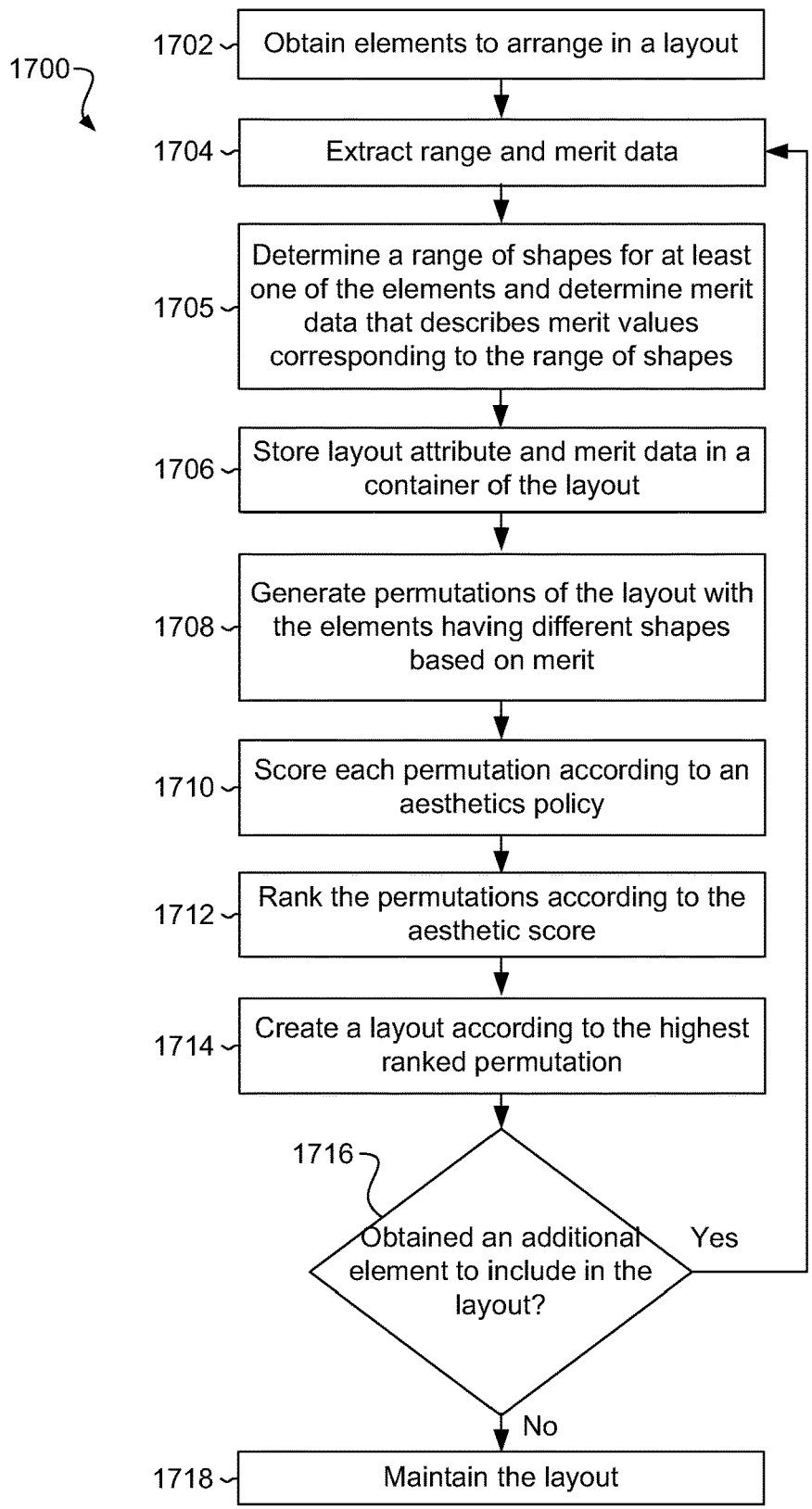
FIG. 17 is a diagram of an example of a flowchart of a process for arranging elements in a layout according to the principles described herein.

FIG. 17 is a diagram of an example of a flowchart (1700) of a process for arranging elements in a layout according to the principles described herein. In this example, the process includes obtaining (1702) elements to arrange in a layout, and extracting (1704) range and merit data from the elements. The process also includes determining (1705) a range of shapes for at least one of the elements and determine merit data that describes merit values corresponding to the range of shapes.

The process also includes storing (1706) the layout attributes and merit data in a container of the layout. The process includes generating (1708) permutations of the layout with the elements having different shapes based on merit value, and scoring (1710) each permutation according to an aesthetic policy. The permutations are ranked (1712) according to their aesthetic score, and the layout is created (1714) with the highest ranked permutation.

The process also includes determining (1716) whether an additional element is to be included in the layout. If so, then the process restarts with extracting (1704) the acceptable range attributes from the additional element to create (1714) the layout with the highest ranked permutation. If no additional element has been obtained, then the process includes maintaining (1718) the layout. For example, while maintaining the layout, the process may also include selecting a permutation of an arrangement with the highest merit value after an element or container is deleted from the layout.

While the examples above have been described with reference to specific types of layouts and ways to obtain elements for the layout, any appropriate layout and/or ways to obtain the elements may be used in accordance to the principles described herein. Further, while the examples above have been described with reference to specific ways of determining or extracting the acceptable ranges for each element, any appropriate mechanism for determining and/or extracting the acceptable ranges may be used in accordance with the principles described herein.

Also, while the examples above have been described with reference to specific places of storing the information pertaining to the acceptable ranges, any appropriate location for storing the information may be used. Further, any appropriate type of information to determine the acceptable range may also be used in accordance with the principles described herein. While the examples above have been described with reference to specific rules in specific policies, any appropriate policy with any appropriate rules may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method executed by a system comprising a processor for arranging elements in a layout, comprising:
    obtaining multiple elements to be arranged in the layout, the layout comprising a container to display the multiple elements;
    determining a range of shapes of the multiple elements;
    determining merit values corresponding to the range of the shapes, wherein the determining of the merit values comprises determining element merit values for a range of shapes of a first element of the multiple elements as a shape of the first element is incrementally increased within the range of shapes of the first element, the determined element merit values being discontinuous such that a first element merit value of a first shape of the first element and a second element merit value of a second shape of the first element are greater than a third element merit value of a third shape of the first element, the first shape smaller than the third shape, and the second shape larger than the third shape;
    storing a description of the range of the shapes of the multiple elements and at least some of the merit values; and
    arranging the multiple elements in the layout based on the merit values to be displayed in a display.

2. The method of claim 1, further comprising generating a merit table that associates the merit values with shape descriptor values that identify unique shapes from the range of the shapes of the multiple elements.

3. The method of claim 1, wherein arranging the multiple elements includes arranging a container layout prior to arranging nested contents inside of the container layout.

4. The method of claim 1, wherein arranging the multiple elements based on the merit values includes selecting a single permutation of an arrangement based on the merit values of the multiple elements.

5. The method of claim 1, wherein arranging the multiple elements in the layout based on the merit values includes determining dimensions of the multiple elements in the container based on the merit values.

6. The method of claim 1, wherein the layout is a magazine layout, a website layout, a portal layout, a page layout, a photo layout, a text layout, or any combination thereof.

7. The method of claim 1, wherein at least one of the multiple elements comprises an image, and the merit values includes characteristics affected with cropping the image.

8. The method of claim 1, wherein the merit values change with changing a size of an element of the multiple elements.

9. The method of claim 1, wherein the merit values change with changing a shape of an element of the multiple elements.

10. The method of claim 1, wherein at least one of the multiple elements comprises a set block of communication characters, and the merit values are affected with moving the set block from a first line of text to a second line of said text.

11. The method of claim 1, wherein the range of the shapes of the multiple elements determine multiple permutations of the layout, the multiple permutations include different arrangements of the layout with varying shapes of the container.

12. The method of claim 1, wherein a second element of the multiple elements is an image, wherein the determining of the merit values comprises determining element merit values for different placements of crop lines that provide respective different crops of the image, and wherein the arranging of the multiple elements in the layout based on the merit values is based on the element merit values for the different placement of crop lines.

13. The method of claim 12, wherein an element merit value for a first crop line that cuts through a portion of a human head is lower than an element merit value for a second crop line that does not cut through the portion of the human head.

14. A system comprising:
    a processor; and
    a non-transitory storage medium storing instructions executable on the processor to:
    obtain elements to arrange in a layout;
    compute merit values corresponding to ranges of attributes of the elements, wherein a first element of the elements is an image, and the computing of merit values comprises computing element merit values for different placements of crop lines that provide respective different crops of the image, wherein the computing of the merit values corresponding to the ranges of attributes of the elements comprises computing element merit values for a range of shapes of a first element of the elements as a shape of the first element is incrementally increased within the range of shapes of the first element, the computed element merit values for the range of shapes of the first element being discontinuous such that a first element merit value of a first shape of the first element and a second element merit value of a second shape of the first element are greater than a third element merit value of a third shape of the first element, the first shape smaller than the third shape, and the second shape larger than the third shape;
    store information about the ranges of attributes of the elements with the corresponding merit values;
    rank permutations of different arrangements of the elements in a layout based on an aesthetic score; and
    arrange the elements in the layout in a display based on the merit values including the element merit values for the different placements of the crop lines.

15. The system of claim 14, wherein the instructions are executable on the processor to crop the image using one of the crop lines based on the element merit values.

16. The system of claim 14, wherein an element merit value for a first crop line that cuts through a portion of a human head is lower than an element merit value for a second crop line that does not cut through the portion of the human head.

17. A non-transitory computer readable storage medium storing program instructions that, when executed, cause a system to:
    obtain multiple elements to be arranged in a layout, the layout comprising a container to display the multiple elements;
    determine a range of shapes for the multiple elements;

determine merit values corresponding to the range of the shapes, wherein the determining of the merit values comprises determining element merit values for a range of shapes of a first element of the multiple elements as a shape of the first element is incrementally increased within the range of shapes of the first element, the determined element merit values being discontinuous such that a first element merit value of a first shape of the first element and a second element merit value of a second shape of the first element are greater than a third element merit value of a third shape of the first element, the first shape smaller than the third shape, and the second shape larger than the third shape;

store information about the range of the shapes of the multiple elements and at least some of the merit values;

generate permutations of the layout with different arrangements of the multiple elements;

rank the permutations based on the merit values; and arrange the multiple elements in the container in a display based on the merit values.

18. The non-transitory computer readable storage medium of claim 17, wherein a second element of the multiple elements is an image, wherein the determining of the merit values comprises determining element merit values for different placements of crop lines that provide respective different crops of the image, and wherein the arranging of the multiple elements in the container based on the merit values is based on the element merit values for the different placement of crop lines.

19. The non-transitory computer readable storage medium of claim 18, wherein an element merit value for a first crop line that cuts through a portion of a human head is lower than an element merit value for a second crop line that does not cut through the portion of the human head.

* * * * *